United States Patent [19]
De Cicco

[11] 3,770,040
[45] Nov. 6, 1973

[54] TIRE WITH SAFETY INDICATOR MEANS
[76] Inventor: Marie Augusta De Cicco, 15 Rosella Ave., Cranford, N.J.
[22] Filed: Sept. 15, 1971
[21] Appl. No.: 180,571

[52] U.S. Cl............ 152/330, 116/114 Q, 152/209 R
[51] Int. Cl............................................. B60c 11/00
[58] Field of Search................ 152/209 R, 330, 314, 152/330 A; 116/114 Q; 73/8

[56] References Cited
UNITED STATES PATENTS

| | | | |
|---|---|---|---|
| 2,706,509 | 4/1955 | White | 152/209 R |
| 3,556,190 | 1/1971 | Riches | 152/209 R |
| 3,123,122 | 3/1964 | Beckadolph | 152/330 |
| 3,232,330 | 2/1966 | Puls | 152/330 |
| 3,578,055 | 5/1971 | French | 152/330 |

FOREIGN PATENTS OR APPLICATIONS

| 724,463 | 12/1965 | Canada | 152/330 |
|---|---|---|---|

Primary Examiner—Drayton E. Hoffman
Attorney—David H. Tannenbaum

[57] ABSTRACT

A tire safety indicator arrangement is shown in conjunction with a tire having an inner portion and a ground engaging tread portion. Mounted on the outside of the inner portion and at the bottom of a groove formed between two treads is an energy transmitting element adapted for reflecting or transmitting the energy entering the groove. As the depth of the groove is shorted due to the wearing away of the treads, the amount of energy entering the groove increases to a point where the reflective or transmitting properties of the groove element enable a viewer to observe the worn condition. Several tread designs are shown and several methods are disclosed for dynamically performing safety checks on a tire having the safety indicator therein.

17 Claims, 6 Drawing Figures

PATENTED NOV 6 1973

INVENTOR
MARIE A. DeCICCO
BY
David Warrenbaum
ATTORNEY

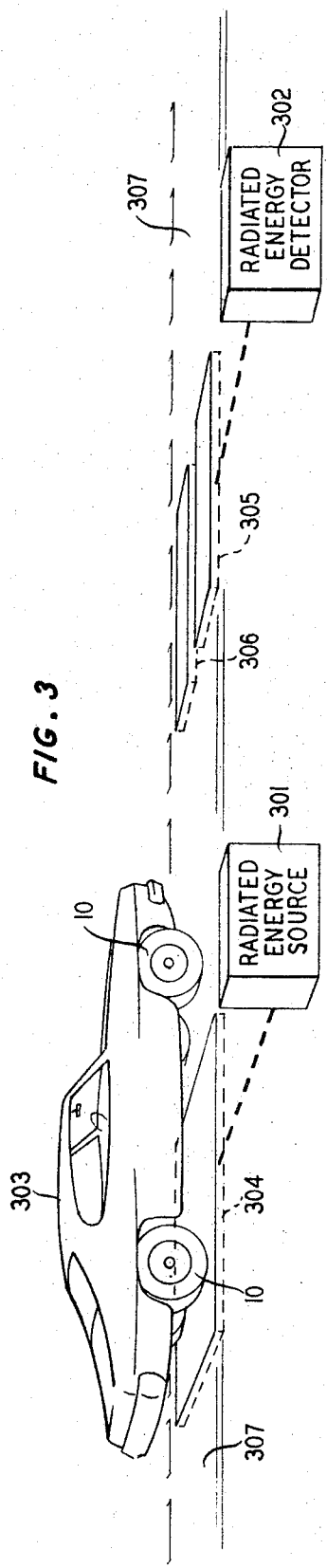
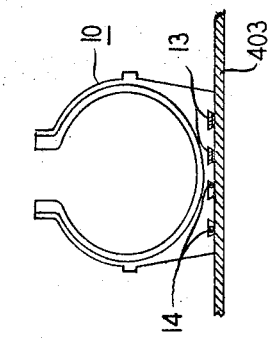
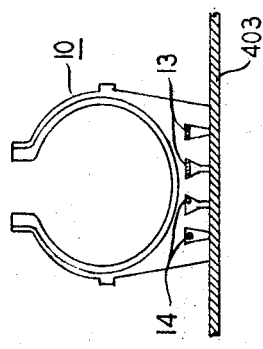
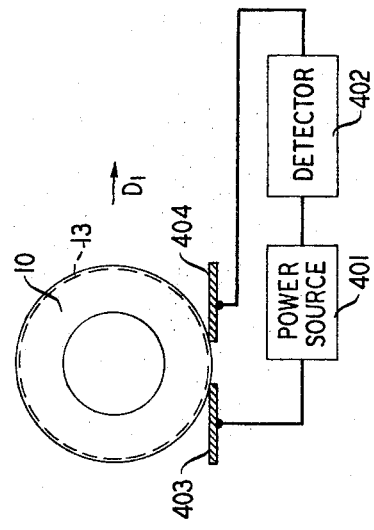

TIRE WITH SAFETY INDICATOR MEANS

FIELD OF THE INVENTION

This invention relates to a device and method for indicating that the tread portion of a motor vehicle tire has been reduced beyond a safe operating limit.

Numerous devices and arrangements have been proposed in the past for providing distinctive indications when the treads of a tire have been reduced beyond a certain useful limit. There is no question that such devices are useful and indeed even necessary if lives are to be saved from needless accidents caused by the operation of motor vehicles with unsafe tires. Normally such tires are unsafe because the tread portion thereof is not sufficient to grip the roadway.

Primarily the method utilized for determining whether tire treads are unsafe is to visually inspect the tread. However, such an approach assumes that the viewer is capable of distinguishing a good tire tread from a marginal or unsafe tire tread. Some states have partially overcome this problem by yearly, or semi-yearly inspections where each tire is checked by a trained inspector. However, even then a marginal tire may not last more than a few weeks or months, depending upon the number of miles driven and the type of driving the tires are subjected to.

One attempt to overcome these problems is to utilize a different color rubber, plastic layer, or plug inside the tire body to indicate wear. A typical example of such an attempt is shown in U. S. Pat. No. 3,516,467 issued to C. D. Sims on June 23, 1970. The Sims patent, as with the other prior art patents, is based upon the proposition that a person untrained in mechanics and probably unconcerned about or unaware of tire tread wear will observe the color indicator and take appropriate action when a special color emerges. In many situations, such a proposition is unwarranted and contrary to actual fact. Thus, a need exists in the art for a tire tread indicator which will be more easily recognized as a danger signal by those unaccustomed to looking for such troubles.

Under prior art wear indicator arrangements when visual checking means are employed alone, an observer typically must approach a tire and look at the tread at close range. Accordingly, the tire must be substantially stationary. Any attempt therefore to have trained personel observe the tire treads of all of the cars entering a certain roadway, such as a turnpike, will create a traffic tieup which may be even more unsafe in terms of likelihood of causing an accident than a detected unsafe tire. Thus, at present, a state attempting to insure to its residents that unsafe out-of-state cars will not be on the highways of the inspecting state (a problem primarily where the inspecting state has a state inspection program and the neighboring state does not) has little practical means, under the present tread wear indicating systems, of performing tire checks on large numbers of cars. In addition, since heat is a prime factor in tire failure external environmental conditions, such as ambient heat, could make a tire tread unsafe for operation beyond a certain speed even though that same tire tread would be perfectly safe for operation well beyond that speed if the ambient temperature were lower. Accordingly, a need exists in the art for a tire tread indicator adaptable for the automatic detection of unsafe tires while the vehicle upon which such a tire is mounted is in motion. And a further need exists in the art for determining that a tire which is safe for operation at one speed is unsafe for operation at some greater speed, or for determining that because of ambient temperatures the safe operation limit of a tire tread has been reduced.

SUMMARY OF THE INVENTION

These and other objectives are obtainable in accordance with one embodiment of my invention where a metal band or wire is positioned around the circumference of the tire at the base of one or more treads. The metal wire is mounted on the outside of the tire casing but remains invisible to the eye when the tire tread is of the proper dimension for safety. Only when the tread has worn beyond the safe limits does the band of metal radiate enough energy to become visible.

In another embodiment of my invention, the metal band or wire is utilized for electrical contact with a detector placed in the roadway, such as at a toll booth. Such contact would only be made when the tire tread has worn beyond a safe limit.

In still another embodiment of my invention a light emitting or phosphorescent substance, is used to form the element around the tire carcass at the base of the tread. Such an arrangement would be particularly useful for easily detecting unsafe tires at night since such tires would create a distinctive glow. The deposited material could be especially sensitive to a particular light frequency, other electrical signal frequencies, or to heat produced energy, and thus is adaptable for the detection of unsafe tire treads.

DESCRIPTION OF THE DRAWING

The tire safety arrangements of my invention will be more fully understood by reference to the drawing, where

FIG. 3 shows one method for automatically detecting unsafe tire treads; and

FIGS. 4, 5, and 6 illustrate another method for automatically detecting unsafe tire treads.

DETAILED DESCRIPTION

Figure 1:
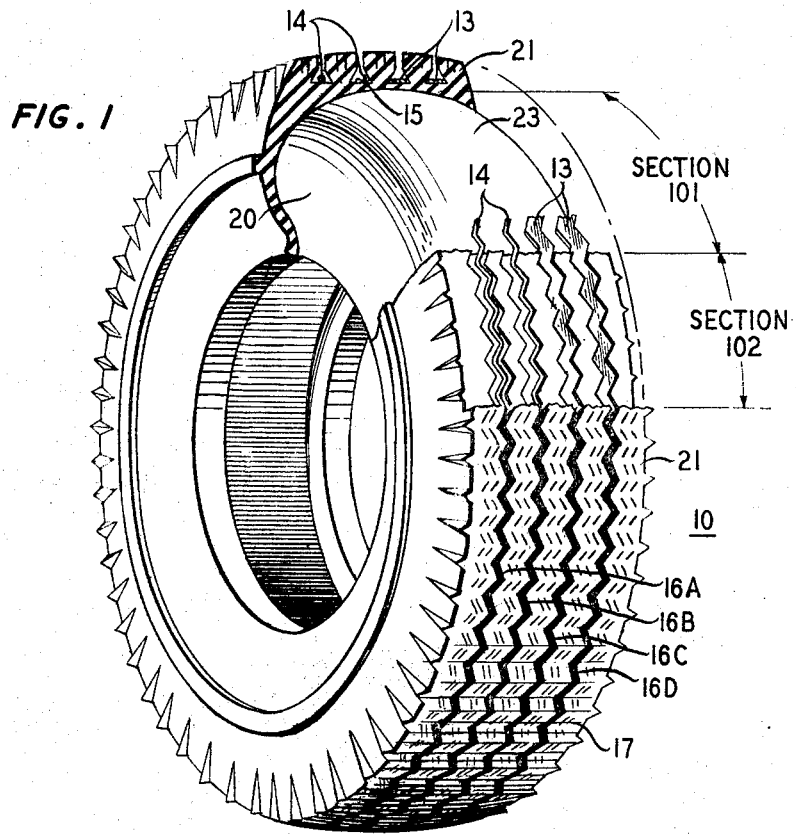
FIG. 1 shows a perspective view of a vehicle tire having both safe and unsafe portions and constructed with certain features of my invention.

In the drawing, FIG. 1 illustrates a vehicle tire 10 including an inner portion 20 and a ground engaging tread portion 21. The treads form a plurality of spaced apart grooves, such as grooves 16A, 16B, 16C, and 16D, having a top surface 17 defined by the outer periphery or ground engagement part of the tread and a bottom surface 15 substantially through the tread portion to a point beyond the outer periphery 23 of casing 20. The extent or depth of the groove being determined by the distance between the bottom surface 15 of the groove and the outer periphery 17 of the tread portion. This type of tire is well-known in the art and is shown in this manner to illustrate one type of tire tread adapted to carry my tire safety device.

Also shown in FIG. 1 is a flat wire 13 or round wire 14 carried inside at least one groove along the bottom surface thereof. As shown, the wire or bar element extends continuously around the circumference of the tire at the base of a particular groove. Section 101 shows the outer surface 23 of casing 20 exposed with the tread completely missing. Section 102 shows a portion of the tread where the groove depth has been decreased to a point (corresponding to line AB, FIG. 2) where elements 13 and 14 are visible from a wide viewing angle. The top opening of each groove is wide enough at this point to allow substantial light or other energy to strike elements 13 and 14. The remainder of the tire is shown with the tread groove depth enough and with the groove top opening small enough to substantially prevent energy from being transmitted to or from the groove bottom surface. Thus, the elements 13 and 14 are not visible.

Figure 2:
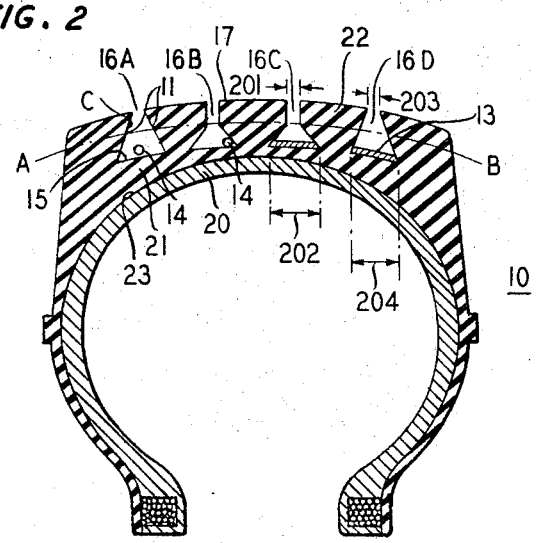
FIG. 2 is a perspective view of an enlarged fragmentary transverse section of the tire shown in FIG. 1.

Turning now to FIG. 2, in its basic form, my invention would utilize a wire, such as wire 14, carried outwardly of the inner casing portion 20 at the bottom surface 15 of one or more grooves 16A through 16D. The wire would be positioned within the groove in a manner such that energy, such as light energy, entering the groove through the top surface 17 opening, such as opening 201 or 203, would be insufficient to cause an attractive image to be observed by a viewer until the groove depth, as measured from the top surface 17 to the bottom surface 15 is reduced to a certain critical dimension. Thus, if line AB represents a line arbitrarily drawn through a tire tread denoting a point inwardly of which the tread portion would be unsafe for use, the point where that line intersects a particular groove, such as point C of groove 16A, would be the critical point of that groove.

One arrangement for providing such invisibility of the element would be to taper the inner groove portion 11 of each tread, as shown in FIG. 2 by grooves 16A and 16D, such that the top surface opening 203 of groove 16D remains relatively narrow until the tread is worn to the critical point. At that point the top surface opening would become large enough to allow light energy, or other energy, to enter the groove and be transmitted through the groove thereby striking the bottom surface 15 of that groove. The element 13 and 14 inside the groove would then reflect or retransmit that energy back through the top surface groove opening 203 to a viewer. Typically, the metal wire would be polished to provide a high degree of reflection to the received energy. Thus, the reflected light would be visible to the viewer even when the vehicle upon which the unsafe tire is mounted is in motion.

Another tire tread design which would provide controlled light reflection from an element carried in a tread groove is shown by the two inner grooves 16B and 16C of FIG. 2. The top surface opening portion 201 of those grooves is relatively constant as the tread circumference (and thus the groove depth) is reduced until the tread is worn inwardly of the line AB intersection point. The then top surface 17 of a groove would widen due to the sloped sides of the groove walls 11 thereby again allowing sufficient energy to be reflected back to a viewer.

In order to increase the reflective ability of the element, that element could be constructed flat as illustrated by element 13 in grooves 16C and 16D. The top surface of such an element could then be more easily adapted for reflective purposes.

A chemical substance could be deposited with either element 13 or 14 or could be deposited directly on the bottom surface 15 of the groove which substance could be primarily adapted for reflecting light frequencies or certain radio frequencies. One example of such a coating would be phosphorous which would provide a characteristic glow even after the energy source has been removed. The intensity of the glow then would be an indication of the amount of light energy striking the coating which in turn is a function of the amount of tread overhanging the groove bottom surface.

The groove device or element could be constructed of any one of the well-known materials having phosphorescent or energy conversion properties. One such material could be heat sensitive thereby converting heat frequency energy to a particular light frequency energy. The conversion could be temporary or permanent and would be constructed to occur at the threshold unsafe condition of the tread. Under such an arrangement, as the tread groove depth is reduced, the heat energy generated by friction between the tread top ground engaging surface and the ground (and the heat generated by the flexing of the treads) moves continuously closer to the indicator device. Since the groove depth is also being reduced as the tread wears away, the amount of air circulating through the groove is reduced and the heat energy transmitted to the device at the base of the groove builds even faster.

When the transmitted energy reaches a temperature corresponding to an unsafe condition of the tire the heat sensitive substance changes from an invisible color, such as black, to a color highly visible, such as yellow, with respect to the color of the tire. One advantage of such an arrangement, of course, would be that a tire which is acceptable for low speed driving (where the generated or ambient heat is low) would not show a failure condition so long as that tire continued to be used for such driving. Also, during a dynamic inspection of tires, the exact failure point of a tire could be determined without destroying the tire.

Another method of utilizing my invention for checking large numbers of cars while they are in motion would be to construct a pit, as shown in FIG. 3, in the roadway, having a top surface, such as surface 304, flush with the roadway bed which surface is constructed for the passage of light or other energy frequencies. When a tire passes over an energy source contained within the pit, such as source 301, the energy would enter the tread grooves in proportion to the groove opening. Behind the light source, or further along the pit in the direction of travel of the tire, a detector, such as detector 302, would be placed, which detector would be sensitive to the amount of reflected or emitted light coming from the tire being checked. When the detected light reaches a certain preset point, the device would provide a signal to an operator that the tire being checked is unsafe. The motorist then could be advised of the safety hazard and appropriate steps taken to remedy the situation before someone is injured as a result of the defective tire.

A still further method of utilizing such a device would be the placement in the roadway of a detector adapted to determine the proximity of metal or other chemical substances. Under such an approach, as illustrated in FIGS. 4, 5, and 6, the detector could be adapted such that the metal band would close an electrical circuit when the rubber of the tread was worn beyond a safe limit. Under this approach, an electrical signal would pass from a first plate 403 through the element 13, if that element is making electrical contact with element 403, as shown in FIG. 6, and back to the detecting circuit simultaneously through electrical contact between element 13 and plate 404. FIG. 5 shows the situation where such electrical contact is not made and thus the tire is safe for continued operation.

Conclusion

While the equipment of my invention has been shown in a particular embodiment wherein a continuous band of metal is circumferentially mounted inside a tire tread for visual and automatic unsafe tread condition detection purposes, it is to be understood that such an embodiment is intended only for illustrative purposes and that numerous other arrangements may be devised by those skilled in the art without departing from the spirit and scope of my invention. For example, the band could consist of non-continuous metallic or other types of elements mounted periodically along the base portion of the groove. Or, the band could consist of energy transmitting material integral with or carried at the bottom surface of the groove.

What is claimed is:

1. In a tire having a casing portion and a tread portion having continuous circumferential grooves formed therein, said grooves extending from a top point at an outer periphery of said tread portion of said tire where said tread portion engages the ground substantially through said tread portion to a bottom point of said tread portion beyond the outer periphery of said casing portion, wherein at least one of said grooves is formed by sides arranged such that said groove has a top point of width smaller than the width of said bottom point so as to control the amount of energy transmitted through said groove from said top point width,
   a device for providing indications when the extent of at least one of said grooves is reduced to a certain predetermined depth representative of an unsafe tread condition,
   said device being a continuous circumferential band permanently secured beyond said periphery of said casing portion at said bottom point of said at least one of said grooves in a position whereby energy transmitted from said outer periphery of said tread through said at least one groove will strike said device,
   said device arranged in conjunction with said groove sides and with said groove top point so as to increase substantially in reflected energy when said groove extent has been reduced to at least said certain point, said substantial increase in reflected energy being controlled by the amount of energy permitted to strike said device.

2. The invention set forth in claim 1 wherein said energy transmitted through said groove is light energy and wherein said device is a light energy reflective metallic band entirely contained within each said groove said metallic band having a side thereof integral with at least one groove side and wherein said tread portion is divided into a plurality of individual tread sections, each extending circumferentially around said tire, said grooves being formed between said tread sections.

3. The invention set forth in claim 2 wherein said metallic band includes a light emitting substance having phosphorescent properties.

4. The invention set forth in claim 2 wherein said metallic band is adapted for the passage of energy signals from a first fixed point on said ground to a second fixed point on said ground.

5. The invention set forth in claim 4 wherein said signals may be passed through said band from said first to said second point when said tire is moving with respect to said ground.

6. The invention set forth in claim 5 wherein said signals are passed from said first point to said metallic band of said tire, through said band and back to said second point substantially simultaneously.

7. The invention set forth in claim 5 wherein said signals are passed from said first point to said metallic band, stored by said band and passed back to said second point a discrete period of time thereafter.

8. The invention set forth in claim 1 wherein said device includes an energy sensitive element adapted to provide a substantially invisible color when said energy striking said element is below a critical point and further adapted to provide a highly visible color when said striking enery increases beyond said critical point.

9. The invention set forth in claim 8 wherein said element is further adapted for providing said highly visible color permanently after said energy first passes said critical point without regard for subsequent variations in said energy levels.

10. The invention set forth in claim 9 wherein said striking energy is heat energy and wherein said critical point corresponds to a threshold unsafe operating point of said tire.

11. The invention set forth in claim 10 wherein said element is a continuous band entirely contained within each of said grooves.

12. The invention set forth in claim 1 wherein said band is positioned in said groove at said bottom of said groove and against a side wall of said groove leaving the bottom of said groove substantially free of said band.

13. In a tire having a casing portion and a tread portion having continuous circumferential grooves formed therein, said grooves extending from a top point at an outer periphery of said tread portion of said tire where said tread portion engages the ground substantially through said tread portion to a bottom point of said tread portion beyond the outer periphery of said casing portion,
    a device for providing indications when the extent of at least one of said grooves is reduced to a certain predetermined depth representative of an unsafe tread condition,
    said device being a continuous circumferential band permanently secured beyond said periphery of said casing portion at said bottom point of at least one of said grooves in a position whereby energy transmitted from said outer periphery of said tread through said one groove will strike said device,
    said device being adapted to be visible to an observer only when said groove extent has been reduced to at least said certain point, said visibility being controlled by the amount of energy permitted to strike said device,
    said device including an energy sensitive element adapted to provide a substantially invisible color when said energy striking said element is below a critical point and further adapted to provide a highly visible color when said striking energy increases beyond said critical point.

14. The invention set forth in claim 13 wherein said element is further adapted for providing said highly visible color permanently after said energy first passes said critical point without regard for subsequent variations in said energy levels.

15. The invention set forth in claim 13 wherein said band is positioned in said groove at said bottom of said groove and against a side wall of said groove leaving the bottom of said groove substantially free of said band.

16. In a tire having a casing portion and a tread portion having continuous circumferential grooves formed therein, said grooves extending from a top point at an outer periphery of said tread portion of said tire where said tread portion engages the ground substantially through said tread portion to a bottom point of said tread portion beyond the outer periphery of said casing portion, a device for providing indications when the extent of at least one of said grooves is reduced to a certain predetermined depth representative of an unsafe tread condition, said device being a continuous circumferential band permanently secured beyond said periphery of said casing portion at said bottom point of at least one of said grooves in a position whereby energy transmitted from said outer periphery of said tread through said one groove will strike said device, said device comprising means for transmitting substantially all of said energy striking said device, means including said tread portion of said tire for substantially inhibiting said energy from striking said device when said tire is new and for increasing the amount of said energy striking said device as said tire becomes worn, and said transmitting means including means for converting energy striking said device from a first frequency to a second frequency.

17. The invention set forth in claim 16 wherein said band is positioned in said groove at said bottom of said groove and against a side wall of said groove leaving the bottom of said groove substantially free of said band.

* * * * *